United States Patent [19]

Verhagen

[11] Patent Number: 4,979,161
[45] Date of Patent: Dec. 18, 1990

[54] DISC-RECORD PLAYER WITH A LOADING DEVICE FOR LOADING A DISC INTO THE RECORD PLAYER

[75] Inventor: Johannes P. C. M. Verhagen, Eindhoven, Netherlands

[73] Assignee: U.S. Philips Corporation, New York, N.Y.

[21] Appl. No.: 675,498

[22] Filed: Nov. 28, 1984

Related U.S. Application Data

[63] Continuation-in-part of Ser. No. 617,068, Jun. 4, 1984, abandoned.

[30] Foreign Application Priority Data

Nov. 8, 1983 [NL] Netherlands ........................ 8303836

[51] Int. Cl.⁵ .............................................. G11B 25/04
[52] U.S. Cl. .................................. 369/77.2; 369/75.1; 369/263
[58] Field of Search .................... 369/75.2, 77.1, 77.2; 367/263, 75.1

[56] References Cited

U.S. PATENT DOCUMENTS 2,959,417 11/1960 Vanderzee et al. .................... 369/37
3,059,882 10/1962 Staar .................................... 369/263
4,509,158 4/1985 Kang .................................. 369/77.2

FOREIGN PATENT DOCUMENTS 185061 10/1983 Japan .................................. 369/75.2

Primary Examiner—Steven L. Stephan
Attorney, Agent, or Firm—John F. Moran

[57] ABSTRACT

In a disc-record player which comprises a resiliently support subframe (5) which carries a turntable (6) and a read means (9) a loading device (14) for loading a disc (15) into the record player comprises a servo means (53) which comprises a plurality of control elements for controlling the movements of the loading device (14). An insertion control element (52) cooperates with a transfer device (17, 29) to guide the disc (15) towards the turntable (6). A lift control element (57c) cooperates with the transfer device (17, 29) to control the movement of the disc (15) towards the turntable (6). A clamping-member control element (71b, 72b) controls at least two clamping members (26) of the transfer device (17, 29) which members hold the disc (15) during loading, and causes the clamping members (26) to be disengaged from the disc after the disc has been lowered onto the turntable (6). A locking means control element (71b, 72b) controls locking means (79; 80) which lock the subframe (5) and causes said latches (79; 80) to become disengaged from the subframe (5) after the disc (15) has been lowered onto the turntable (6).

27 Claims, 8 Drawing Sheets

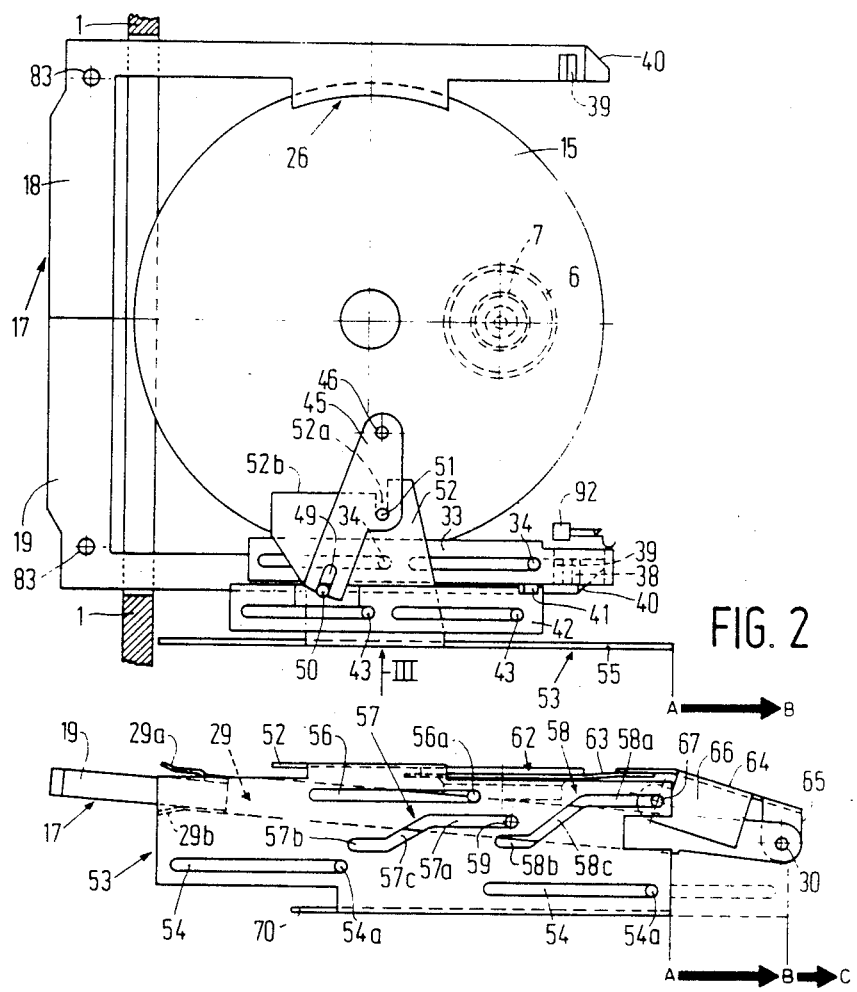

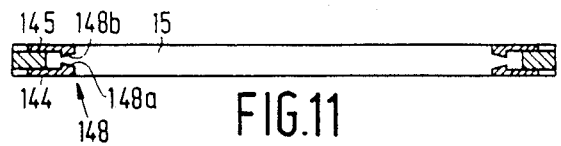
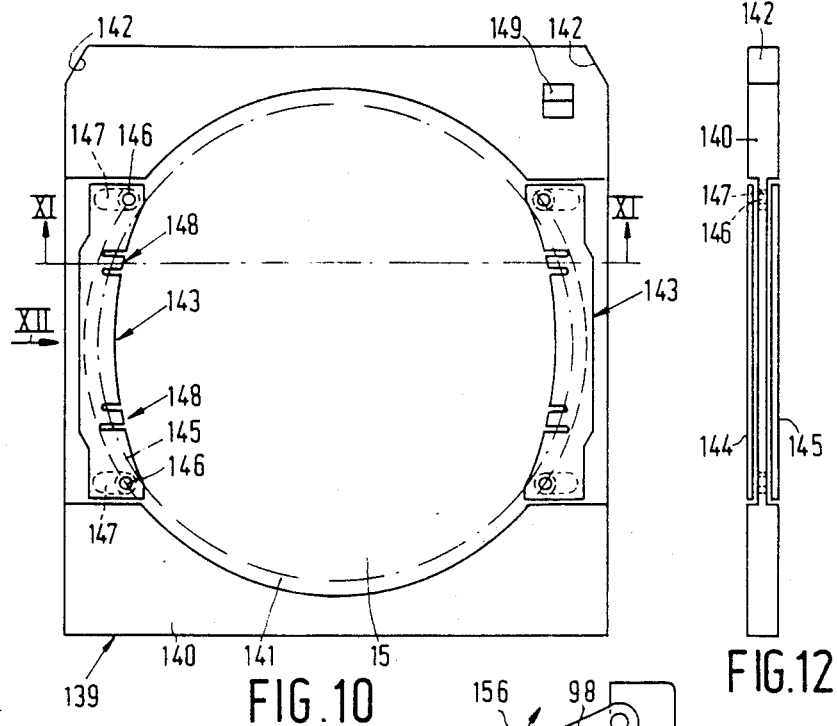
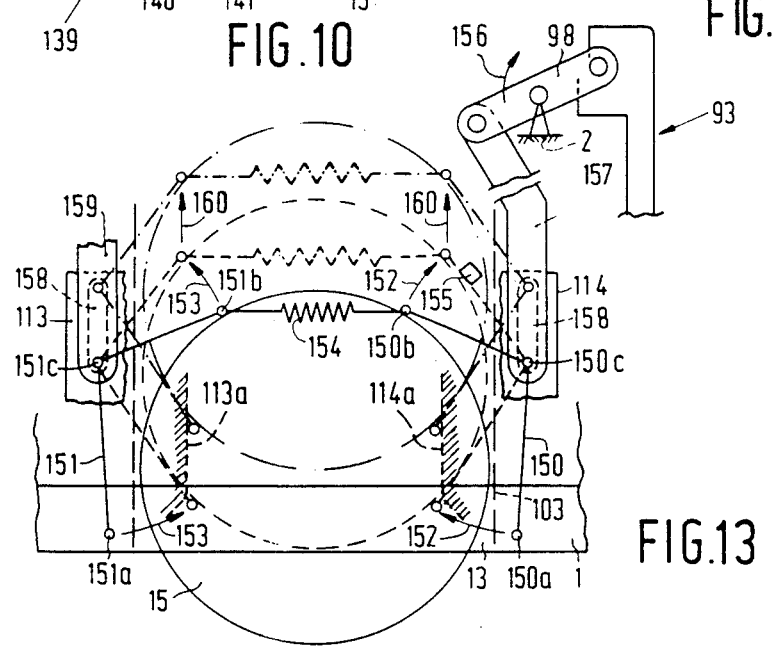

DISC-RECORD PLAYER WITH A LOADING DEVICE FOR LOADING A DISC INTO THE RECORD PLAYER

This application is a continuation in-part of my application Ser. No. 617,068 filed Jun. 4, 1984 now abandoned.

BACKGROUND OF THE INVENTION

The invention relates to a disc-record player which comprises a housing, a frame and a resiliently supported subframe which carries a turntable and a read means, and a loading device for loading a disc into the record player; and more particularly to such a player in which the loading device comprises a transfer device which can move the disc from a front opening in the housing to a position over the turntable and subsequently towards the turntable to deposit the disc on the turntable, the movements of said transfer device being controlled by a servo. The servomechanism is driven by a drive motor and comprises a plurality of control elements for controlling the various movements of the loading device, including an insertion control element which cooperates with the transfer device to control the insertion movement of the disc towards a position over the turntable, and a lift control element which cooperates with the transfer device to guide the disc towards the turntable.

Such a loading device is known from British Patent application No. 2,112,994 and is intended for loading a disc into a disc-record player constructed for playing optically readable disc records, such as those of the "Compact Disc" type. During loading these discs must be centered correctly relative to the turntable axis. If the housing of such a disc-record player with a resiliently supported subframe is subjected to shocks or vibrations during loading this may readily disturb the pre-centered position of the disc in the transfer device, so that the disc, as it is moved towards the turntable, may become off-centered to such an extent that it ultimately occupies an incorrect position on the turntable. Such improper alignment must be avoided in order to ensure a satisfactory operation of the disc-record player.

SUMMARY OF THE INVENTION

The invention aims at constructing a loading device of the type specified in the opening paragraph in such a way that during loading of the disc shocks and vibrations can have no adverse effects.

To this end the invention is characterized in that the servo means also comprises:

a clamping member control element with controls at least two clamping members of the transfer device; these clamping members hold the disc in the transfer device during loading, and are caused by the clamping member control element to be disengaged from the disc after the disc has been deposited on the turntable, and a locking means control element which controls locking means that lock the subframe relative to the frame during loading of the disc, and which causes the locking means to be disengaged from the subframe after the disc has been deposited onto the turntable.

This results in a loading device with a centrally driven servo means, which by means of the various controls elements controls the movements of all the parts of the loading device involved in loading a disc. When the disc has been inserted manually through the front opening, the insertion control element ensures that the transfer device moves the disc to a position over the turntable. Subsequently the transfer device with the disc are moved towards the turntable by the lift control element to deposit the disc onto the turntable. When the disc has reached the turntable, the clamping-member control element causes the disc to be released from the disc holder by means of a coupling with the clamping members of the transfer device, thereby disengaging the loading device from the disc.

Once the disc has been released from the loading device the locking means control element unlocks the subframe which carries the turntable, so that the subframe and the turntable are no longer rigidly coupled to the loading device. If the housing is then subjected to shocks or vibrations during playing of the disc, the subframe, which is resiliently supported relative to the frame and which carries the turntable, can move relative to the housing without being obstructed by the loading device.

When the disc is removed from the disc-record player these operations are performed in the reverse order, that is to say, first the subframe is locked relative to the housing so that the subframe is held rigidly in a fixed position relative to the loading device, next the clamping members of the transfer device again grip the disc, the transfer device then moves the disc away from the turntable and finally the disc is slid outwards until it projects at least partly from the front opening in the housing and can be removed from the record player by the user.

This arrangement of the parts of the loading device of the present invention results in a compact construction, which is particularly suitable for use in disc-record players in mobile installations, for example those fitted in cars. In this respect it is advantageous if during loading the subframe is held rigidly in a fixed position relative to the housing, and the disc is held in the transfer device to keep the disc in the correct pre-centered position as it is deposited on the turntable, thereby ensuring that the disc is correctly positioned on the turntable.

In the loading device in accordance with GB-A 2,112,994 the servo means is rectilinearly guided on the frame and comprises at least one servo member having a control plate which relative to the direction of insertion is situated adjacent the transfer device. In accordance with another aspect of the invention the control plate adjoins at least one control limb which extends from the control plate towards the transfer device. The rectilinear movement of the servo means and the particular arrangement of the parts of the servo minimizes the additional space occupied by the servo inside the housing.

A preferred embodiment of the invention is characterized in that the transfer device utilizes a disc holder containing a disc, and transfer means. The disc holder is transferred into the transfer means to a position over the turntable by means of the insertion control element and is subsequently transferred with the transfer means to the turntable via the lift control element, the two clamping members forming part of the disc holder. Thus, the disc, which is retained in the disc holder, can be inserted easily, the disc being released from the disc holder by the clamping member control element after it has been placed onto the turntable.

In this respect another preferred embodiment of the invention is characterized in that the disc holder becomes coupled to an actuating slide by insertion into the transfer means, the insertion control element being situated on a control limb and being coupled to the actuating slide by a pivotally mounted stroke-amplifying lever, the side is subsequently moved by this control limbs to move the disc holder until it is over the turntable. Thus, a comparatively short movement of the servo means results in a large displacement of the disc holder in the transfer means.

Another preferred embodiment of the invention, which also comprises a disc pressure means which can be moved towards the turntable into a pressing position to urge the disc against the turntable, may be characterized in that the servo means also comprises a pressure-control element for controlling the movement of the disc-pressure means towares the pressing position. Thus, the pressure-control element ensures that once the disc has reached the turntable it is effectively urged against this turntable.

A further preferred embodiment of the invention is characterized in that the lift control element and the pressure-control element respectively are constituted by first and second inclined guideways on the control plate, each of the inclined guideways adjoining at its ends straight guideways which extend parallel to the direction of movement of the control plate. The inclined guideways are so arranged relative to each other that the movement of the disc-pressure means is faster than the movement of the transfer means. This enables the disc-pressure means to be moved through a greater distance relative to the turntable than the transfer means, so that during insertion of the disc the disc pressure means does not obstruct the movement of the transfer device and, when the disc is deposited on the turntable, the disc-pressure means can urge the disc effectively against the turntable.

Another preferred embodiment of the invention is characterized in that the clamping-member control element is constituted by two mutually inclined guideways on another or the second control limb. These guideways move two sliding elements which are coupled to the clamping members during the movement of the other or the second control limb, and, when moved by the guideways move those clamping members apart from the disc. Thus, during the movement of the servo means the transfer device releases the disc, the clearance between the clamping members and the disc after release of the disc being such as to allow free movement of the resiliently supported subframe during playing.

In the loading device in accordance with GB-A 2,112,994 the servo means comprises first and second servo members which are situated on opposite sides of the transfer means and are driven by a common drive means. In this respect yet another preferred embodiment of the invention is characterized in that the first servo member comprises a first control limb and a control plate, and the second servo member comprises a second control limb and a control plate. Thus, the first servo member controls the movement of the transfer device and the second servo member controls the clamping members. This can lead to an efficient use of the space available in the disc-record player. Preferably, in this embodiment the sliding elements carry coupling pins which engage the clamping members during the movement towards the turntable. These pins ensure that the disc is released from the transfer device in a reliable manner and the clamping members remain clear of the disc in the correct positions during playing.

In this respect still another preferred embodiment of the invention is characterized in that the locking means control element is constituted by two mutually inclined guideways, the sliding elements carrying locking means which are situated on opposite sides of the subframe and which are disengaged from the subframe to unlock the subframe by movements of the sliding elements relative to each other. Thus, by means of the two guideways the locking means control element ensures that the subframe is unlocked subsequently to the release of the disc from the transfer device. Preferably the locking means comprise openings in the sliding elements. These openings are engangeable by pins which are mounted on opposite sides of the subframe and which have a length such that the subframe is not unlocked until the clamping members have been moved apart and the disc has been released from the transfer device. The arrangement of the pins and the choice of the length of these pins ensure that the subframe cannot be unlocked until the disc has been released.

Another preferred embodiment of the invention is characterized in that the pressure-means control element is constituted by two mutually inclined guideways, the two sliding members each being coupled to an associated wedge-shaped lifter for moving the disc-pressure means away from the turntable and the disc pressure means being spring-loaded towards the turntable. This construction enables the disc pressure means to be moved up and down relative to the turntable by a mechanism which occupies a minimal height inside the housing. This is an advantage, for example in the case of automotive uses where a minimal height of the housing is desired.

In this respect a further preferred embodiment is characterized in that each lifter is arranged on a slide which also constitutes a lateral guide portion of the transer device for guiding the disc holder, and which is coupled to the associated sliding element in such a way as to be movable relative thereto in directions corresponding to the direction of movement of the transfer means. As an integrated unit each lifter also provides lateral guidance for the disc holder. This ensures that the movement of the disc-pressure means relative to the transfer device is guided correctly. Moreover, the lifters can be moved towards the turntable together with the transfer device without being obstructed by the sliding elements.

Another preferred embodiment of the invention is characterized in that the transfer device comprises two pivotal bifurcate levers whose free ends are each provided with a clamping means for retaining the disc. These bifurcate levers are each coupled to a slide member which is operable to move the levers in mutually opposite directions by means of the clamping-member control element. Thus, it is alternatively possible to clamp the disc between the levers by manual insertion of the disc into the front opening after which the levers with the disc are transferred to the turntable by the servo means. Subsequently, the clamping-member control element causes the levers to release the disc.

Three embodiments of the invention will be described in more detail, by way of example, with reference to the drawings.

BRIEF DESCRIPTION OF THE DRAWING

FIG. 2 is a schematic plan view of part of the loading device of the record player, shown in FIG. 1 with the disc holder in a position which it occupies in the housing of the record player when it has been inserted manually into the transfer means, the transfer means and the disc pressure means being omitted for the sake of clarity;

FIG. 3 is a side view of the loading device taken in the direction of the arrow III in FIG. 2;

FIG. 10 is a plan view of the disc holder shown in FIG. 9;

FIG. 11 is a sectional view taken on the line XI—XI in FIG. 10;

FIG. 12 is a side view looking in the direction of the arrow XII in FIG. 10; and FIG. 13 is a schematic plan view of the loading device in a third embodiment of the invention.

DESCRIPTION OF THE PREFERRED EMBODIMENTS

Figure 1:
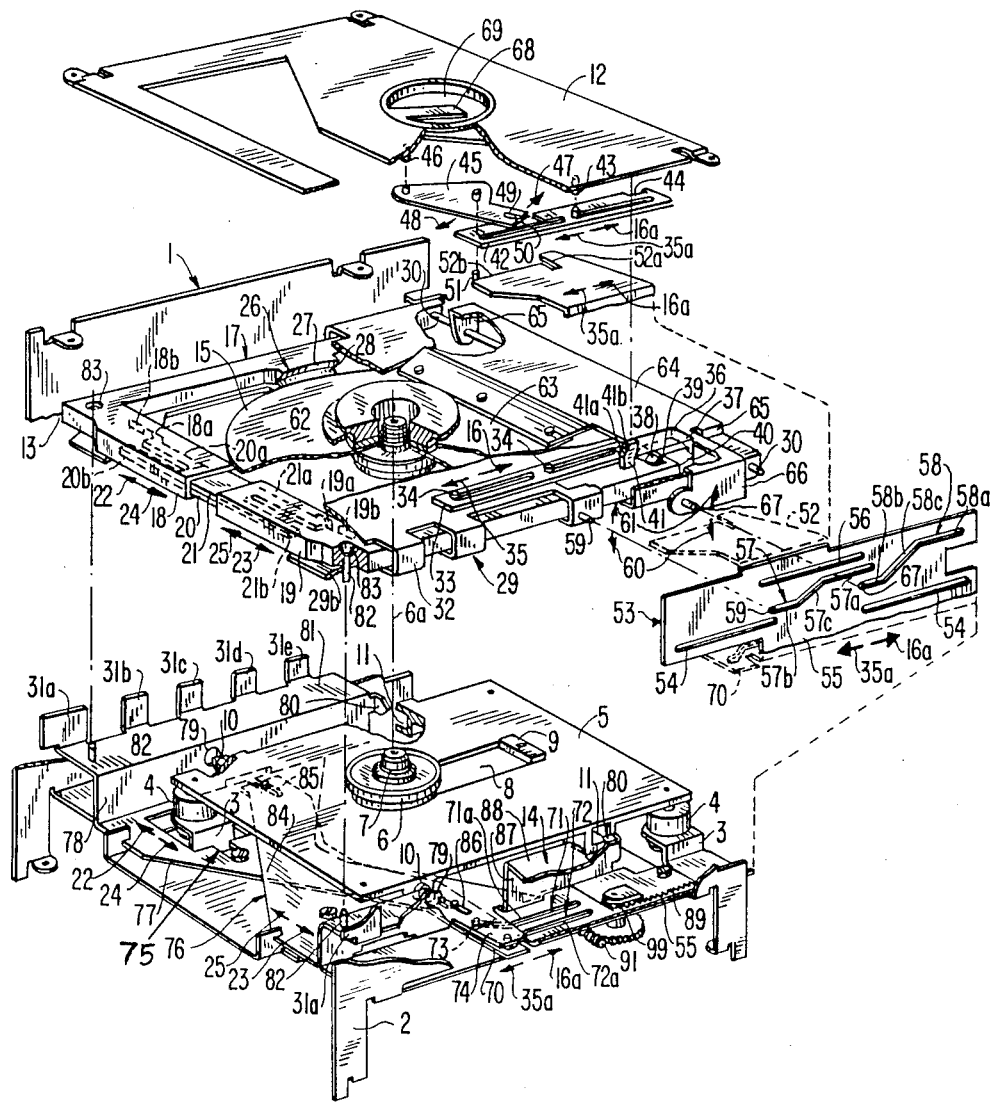
FIG. 1 is an exploded perspective view of a disc-record player according to a first embodiment of the invention.

The disc-record player shown in FIG. 1 which shows a record disc in the playing position, comprises a housing 1, of which only part is shown for the sake of clarity. Inside the housing 1 four brackets 3 are secured on a frame 2 and each carry an elastic buffer 4. In the present embodiment the buffers 4 are made of rubber. A rectangular subframe 5 is supported resiliently on the frame 2 by the buffers 4. The subframe 5 carries a turntable 6 which is rotatable about an axis 6a and which is provided with a centring zone 7 on the upper side. Further, the subframe 5 has a slot 8 in which a read means 9 is movable in a radial direction relative to the turntable 6. The read means 9 is an optical read head which is intended for scanning optically readable discs, which are of the "Compact Disc" type in the present example. On two opposite sides the subframe 5 is provided with pins 10 which each have a circularly cylindrical main portion and a tapered free-end portion. The subframe 5 also has openings 11 in said opposite sides, which openings are preferably rectangular. It is to be noted that the buffers 4 support the subframe 5 in such a way that the center of gravity of the subframe with the parts arranged on it at least substantially coincides with the center of the spring system formed by the elastic buffers 4 (the so-called "centre of compliance"). Depending on the positional arrangement of the subframe the buffers 4 may be arranged to occupy a different position relative to the subframe. This can be done by adapting the brackets 3. For example, instead of the horizontal position shown, the subframe may be arranged in a vertical position.

On the upper side the housing 1 is covered by a cover 12, and at the front the housing has a front opening 13. Parts of the housing also form part of the frame 2. The frame carries a loading device 14 for loading and unloading a record disc 15, which loading device comprises a removable disc holder 17 which can be slid into and out of the housing through the front opening 13 in directions indicated by the arrows 16 and 35 respectively. The disc holder 17 is U-shaped and comprises two L-shaped clamping members 18 and 19 which are arranged mirror-symmetrically relative to each other so that a disc 15 can be clamped at its edge between the long limbs of the clamping members. The short limb of each clamping member is hollow and it is fixed in a plate 21, 20 respectively. Each plate projects from the open free end of the associated short limb and, lying slidably against the other plate, extends slidably into the other short limb through the open free end thereof. The directions of the sliding movement of the plates 20 and 21 are indicated by the arrows 22 to 25 in FIG. 1. At their free ends the sliding plates 20 and 21 are bifurcated so that they each comprise two limbs 20a, 20b and 21a, 21b respectively. The limbs 20a and 21a which are slightly resilient, have lateral projections with oblique edges which in conjunction with openings 18a, 18b and 19a, 19b respectively in the short limbs of the clamping members 18 and 19 constitute clamping means which clamp the two clamping members 18 and 19 together when they have been moved towards each other in the directions indicated by the arrows 24 and 25 respectively, and also constitute as stops to limit the separation of the clamping members when they are moved away from each other in the directions indicated by the arrows 22 and 23 respectively. The long limbs of the clamping members 18 and 19 are each provided with a clamping portion 26, FIG. 1 showing only the clamping portion 26 on the clamping member 18. The clamping portions 26 have an arcuate shape corresponding in radius to the disc 15 to enable the disc 15 to be clamped securely between the two clamping portions 26 at two diametrically opposed locations on the edge of the disc when the clamping members 18 and 19 are moved towards each other. For this purpose the arcuate clamping portions 26 are each formed with a groove of V-shaped cross-section, the walls 27 and 28 of which form converging clamping surfaces for engaging over a portion of the edge of the disc 15. Thus, the disc 15 is always precentred correctly in the disc holder 17 when the two clamping members 18 and 19 have been moved towards each other and have been clamped in position relative to each other. However, it is to be noted that, as will be described hereinafter, the loading device may employ other types of disc holders comprising clamping members.

Via the front opening 13 the disc holder 17 is inserted into a transfer means 29 of the loading device in the direction indicated by the arrow 16, which transfer means is pivotally connected to the frame 2 by a spindle 30 at the side of the frame which is remote from the front opening 13. The transfer device of the loading device comprises both the disc holder 17 and the transfer means 29. In the position occupied by the loading device when loading begins, which position (shown in FIGS. 2, 3 and 4) is reached when the disc holder 17 has been inserted manually into the transfer means 29, and which the transfer means 29 is in a slightly raised position (see FIG. 3). The clearance of the disc holder 17 in the transfer means 29 in the direction indicated by the arrows 22 and 23 is such as to allow the clamping members 18 and 19 to be moved towards and away from one another while in the transfer means. Upright lugs 31a to 31e, whose height increases towards the front opening 13 from the lug 31e to the lug 31a, provide lateral guidance for the disc holder during its insertion. The lugs 31 project into the transfer means through openings in the bottom and the side walls 32 of the transfer means 29 in such a way that also near the front opening 13 a satisfactory lateral guidance for the disc holder 17 is obtained in the raised position of the transfer means.

A first actuating slide 33 is slidably arranged on the upper side of the transfer means 29 and is guided rectilinearly on the transfer means 29 in reciprocal directions indicated by the arrows 16 and 35 by means of pins 34 on the transfer means engaging in slots in the slide near its end which is remote from the front opening. The first actuating slide 33 is provided with a clamping member 36 which comprises a hook 37 and a projection 38. At the end of the manual insertion of the disc holder 17 into the transfer means the projection 38 snaps into a recess 39 formed in the upper side of the long limb of the clamping member 19 near the free end thereof. To simplify manufacture the long limb of the clamping member 18 is provided with a similar recess 39, even though this recess will not be used. To facilitate insertion both the recess 39 and the projection 38 are of V-shaped cross-section. Further to facilitate insertion, at their free ends the long limbs of the clamping members 18 and 19 are provided with bevelled surfaces 40 on their outer sides, which surfaces converge towards each other in the direction of the arrow 16. In the inserted position of the disc holder the hook 37 of the member 36 engages around the free end of the long limb of the clamping member 19. Thus, when the disc holder 17 has been inserted a secure coupling is obtained between the first actuating slide 33 and the disc holder 17 both in the direction of the arrow 16 and in the direction of the arrow 35. The first actuating slide 33 is provided with a projection 41 which extends towards the cover 12 and which has inclined wall portions 41 and 41b at the side which faces the front opening 13 of the housing 1. By means of the projection 41, the first actuating slide 33 is coupled to a second actuating slide 42. The second actuating slide 42 is guided rectilinearly on the lower surface of the cover 12 in directions indicated by the arrows 16a and 35a. The rectilinear guidance of the actuating slide 42 on the cover 12 is provided by pins 43 on the cover engaging in slots in the slide. The first actuating slide 33 and the second actuating slide 42 are coupled to each other by engagement of the projection 41 with the walls of a recess 44 in the second actuating slide 42. The cover 12 further carries a stroke-amplifying lever 45 which is pivotally connected to the cover 12 by means of a spindle 46. The lever 45 is pivotable in directions indicated by the arrows 47 and 48. In its free end the lever 48 has a slot 49 in which engages a pin 50 projecting from the upper side of the second actuating slide 42. Further, the lever carries a downwardly projecting pin 51 which is disposed substantially halfway between the spindle 46 and the pin 50 and which in an initial position shown in FIG. 2 engages in a slot 52a in a first control limb 52. The control limb 52 forms part of a servo member 53, which constitutes a servo means of the loading device 14. The first control limb 52 of the servo member 53 extends substantially parallel to the cover 12 and is situated between the actuating slides 33 and 42 which are arranged close to each other.

By means of horizontal straight guideways 54 in an upright control plate 55 the servo member 53 is guided rectilinearly on the frame in the directions indicated by the arrows 16a and 35a. The control plate 55 has a third straight guideway 56 extending parallel to the guideways 54 to preclude tilting of the control plate 55. In FIG. 3 the guideways 54 and 56, in the form of slots in the plate 55, are engaged by pins 54a and 56a respectively, which are connected to the frame 2.

The control plate 55 further has a first control slot 57 and a second control slot 58. The control slot 57 comprises an inclined guideway 57c which at its ends adjoins straight guideways 57a and 57b respectively which extend parallel to the direction indicated by the arrow 16a. In the same way the control slot 58 comprises an inclined guideway 58c adjoining straight guideways 58a, 58b which extend parallel to the direction indicated by the arrow 16a. The slope of the guideway 58c may be steeper than that of the guideway 57c and the distance between the straight guideways 58a and 58b may be greater than that between the straight guideways 57a and 57b. The control slot 57 is engaged by a pin 59 which is rigidly connected to that side wall 32 of the transfer means 29 which is adjacent the control plate 55. Thus, the pin 59 is moved in the control slot 57 when the control plate 55 is moved, causing the transfer means 29 to be pivoted about the spindle 30 during the passage of the pin up or down the inclined guideway 57c. During movement of the control plate 55 in the direction of the arrow 16a the pin 59 is moved from the position shown in FIG. 3 to the position shown in FIG. 6, resulting in a pivotal movement of the transfer means in the direction indicated by the arrow 60. During the return movement of the control plate 55 the transfer means is pivoted in the reverse direction indicated by the arrow 61 in FIG. 1.

A disc pressure means 62 mounted in an opening in a blade spring 63 is also pivotable about the spindle 30. The blade spring 63 is secured to a plate 64 which constitutes a pivotable arm. It is to be noted that the blade spring 63 is used to minimize the height of the housing 1. If this height is not limited the plate 64 may be extended, in a manner not shown, towards the front to carry the disc pressure means directly. The plate 64 comprises lugs 65 by means of which it is pivotally mounted on the spindle 30, and a downwardly bent side wall 66 from which a pin 67 projects. The pin 67 extends into the control slot 58 and during the movement of the control plate 55 the pin moves from the straight guideway 58a down the inclined guideway 58c into the straight guideway 58b or in the reverse direction, depending on whether the control plate is moved in the direction of the arrow 16a or the arrow 35a. As a result of the movement of the pin 67 in the control slot 58 the plate 64 is pivoted about the spindle 30 in the direction indicated by the arrow 60 or the arrow 61 respectively. In the position shown in FIGS. 2 and 3 the upper side of the disc pressure means 62 bears against a resilient tongue 68 which is secured to the cover 12 and which is situated in a circular opening 69 in the cover 12. When it is not loaded the tongue 68 is inclined slightly downwards. During movement of the disc pressure means 62 towards the upper position the blade spring 63 is curved, so that the tongue 68 is deflected upwards, which ensures that the disc pressure means, which has some circumferential clearance relative to the blade spring 63, cannot move upwards too far. This construction is of special importance if the record player is arranged in a vertical position, i.e. with the turntable rotatable about a horizontal axis. In this position the tongue 68 prevents the disc pressure means 62 from falling out of the opening in the blade spring 63, and during the passage of the pin 67 down the inclined guideway 58c to move the plate 64 in the direction of the arrow 60, the tongue 68 ensures that the disc pressure means correctly follows the blade spring 63. The position of the guideway 58c at a shorter distance from the spindle 30 than the guideway 57c, if desired in conjunction with a steeper slope of the guideway 58c in comparison with that of the guideway 57c, results in the pivotal movement of the disc pressure means 62 about the spindle 30 being performed more rapidly than the movement of the transfer means 29 about the spindle 30. The consequences of this will be explained in more detail hereinafter. In a cross-section perpendicular to the arrow 16a the servo member 53 is U-shaped, the limbs of the U being formed by the first control limb 52 and a second control limb 70 which extends from the control plate 55 on the opposite side of the transfer means 29 from the control limb 52. The control plate 55 is situated adjacent the transfer means. The second control limb 70 has two control slots 71 and 72 comprising straight guideways 71a and 72 respectively which extend parallel to the arrow 16a. The straight guideways 71a, 72a adjoin guideways 71b, 72b which diverge in the direction of the arrow 35a and which adjoin comparatively short straight guideways 71c, 72c extending parallel to the direction indicated by the arrow 16a. The control slots 71 and 72 are engaged by pins 73 and 74 respectively which are situated on plate-shaped sliding elements 75 and 76 respectively of the loading device. The sliding element 76 comprises a sliding plate 77 which extends in a horizontal plane from the pin 73 to that side of the subframe 5 which is remote from the control plate 55. Adjacent this side of the subframe 5 the sliding plate 77 adjoins an upright wall 78 of the sliding element 75 in which wall an opening 79 is formed which is engageable by the pin 10 on the adjacent side of the subframe 5. The side wall 78 also comprises a projection 80 which has a main portion with parallel edges and a tapered face-end portion and which is engageable in the opening 11 in the adjacent side of the subframe 5. The opening 79 and the projection 80 constitute locking means which can lock the subframe 5 at the respective side thereof. A horizontal wall 81 of the sliding element 75 adjoins the upright wall 78 and carries a coupling pin 82 on its upper surface, which pin is situated at a comparatively short distance from the front opening 13. In a manner to be described hereinafter the pin 82 is engageable in a bore 83 in the clamping member 18. The bore 83 is situated near the junction of the two limbs of the clamping member 18. The sliding element 76 comprises a sliding plate 84 which extends at least partly over the sliding plate 77 in a horizontal plane from the pin 74 to that side of the subframe 5 which is remote from the control plate 55. Preferably the two sliding plates 77 and 84 are slidable on each other in the area where they overlap a correct guidance of the plates in the directions indicated by the arrows 22, 23 and 24, 25, respectively being obtained by means of pin-and-slot connections 85 and 86 between the plates, which connections are situated at opposite sides of the subframe 5. The sliding plate 84 adjoins an upright wall 87 of the sliding element 76, which upright wall adjoins a horizontal wall 88. The walls 81 and 88 are each formed with a row of spaced, co-planar upright lugs 31. An opening 79 is also formed in the wall 87 and a further projection 80 projects from the wall 87 towards the opening 11 in the adjacent side of the subframe. Again this opening 79 and projection 80 constitute locking means for locking the subframe 5 at the respective side thereof. The horizontal wall 88 carries a coupling pin 82 which is engageable in a bore 83 in the clamping member 19.

For moving the servo member 53 in the directions indicated by the arrows 16a and 35a the second control limb 70 is provided with a toothed rack 89 which cooperates with a pinion 90 which can be driven by a drive motor, not shown, by means of worm gear 91.

The loading device 14 described above operates as follows:

A disc record, which in the present example is of the "Compact Disc" type, is insertred in the disc holder 17 outside the record player. This may be effected in either of two ways, namely by passing the disc between the free ends of the long limbs of the clamping members 18 and 19 of the disc holder and fitting the disc between the clamping portions 26, which is possible due to the slight resilience of the long limbs of the clamping members 18 and 19, or by pulling the two clamping members 18 and 19 away from each other in the directions indicated by the arrows 22 and 23 to permit insertion of the disc and then moving them back as indicated by the arrows 24, 25 after the disc has been inserted. The disc is now firmly held in the disc holder 17, the short limbs of the clamping members 18 and 19 being constructed so that they can also be used as a handle. It is to be noted that the bifurcated sliding plates 20 and 21 with the limbs 20a, 20b and 21, 21b respectively and the clamping projections thereon are of great advantage in sliding the clamping members 18 and 19 into and out of each other. The clamping projections ensure both that the separation of the clamping members is limited and that the two members are clamped together to hold the disc. In this respect it is to be noted that the clamping members 18 and 19 are preferably identical. This has the advantage that only one die is required for the manufacture of the clamping members. Owing to the construction of the clamping members the disc holder is particularly suitable for mass production and the disc holder can be manufactured cheaply.

Subsequently, the disc holder 17, which, for example, has been taken from a storage case containing a plurality of such disc holders each carrying a disc, is inserted through the front opening 13 of the housing 1 into the transfer means 29 in the direction indicated by the arrow 16. Insertion is facilitated by the presence of two outwardly diverging upper and lower wall portions 29a and 29b of the transfer means 29 at the front thereof (see FIG. 3). During insertion of the disc holder the transfer means 29 occupies a raised position in which it is inclined upwardly towards the front, as shown in FIG. 3. As already mentioned, lugs 31 on the sliding elements 75 and 76 project into the transfer means 29 and provide lateral guidance for the disc holder as it is inserted into the transfer means. Insertion is facilitated by the bevelled surfaces 40 at the free ends of the long limbs of the clamping members 18 and 19. The disc holder 17 is inserted manually into the transfer means as far as the position shown in FIGS. 2, 3 and 4.

At the end of the insertion movement, after sliding on the long limb of the clamping member 19, the projection 38 on the first actuating slide 33 moves downwards into the recess 39 in the clamping member 19. This movement of the projection 38 is possible because at this stage the slide 33 can move up and down slightly relative to the transfer means 29. Then, the disc holder 17 can be coupled to the servo member 53. At this instant a switch 92 is closed, which switch starts the drive motor (not shown) for the servo member so that this member is moved in the direction indicated by the arrow 16a. Prior to the movement of the servo member the various parts of the loading device occupy the positions shown in FIGS. 2, 3 and 4. The short limbs of the clamping members 18 and 19 are still situated outside the housing, and thruogh the locking means formed by the openings 79 and the projections 80 the loading device holds the subframe 5 rigidly to cancel the resilience of the support provided by the buffers 4 so that the relevant parts of the loading device are positioned accurately relative to the turntable carried by the subframe.

Figure 4:
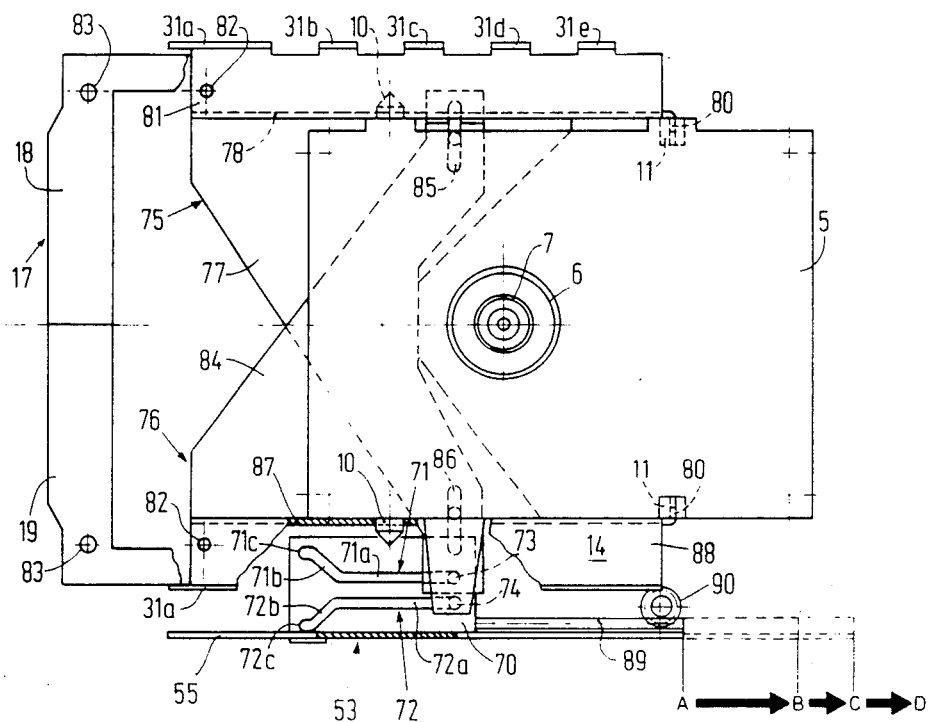
FIG. 4 is a plan view of the loading device in the same position as is shown in FIGS. 2 and 3, with the transfer means, the disc pressure means and the disc omitted and some other parts broken away, for the sake of clarity.
Figure 5:
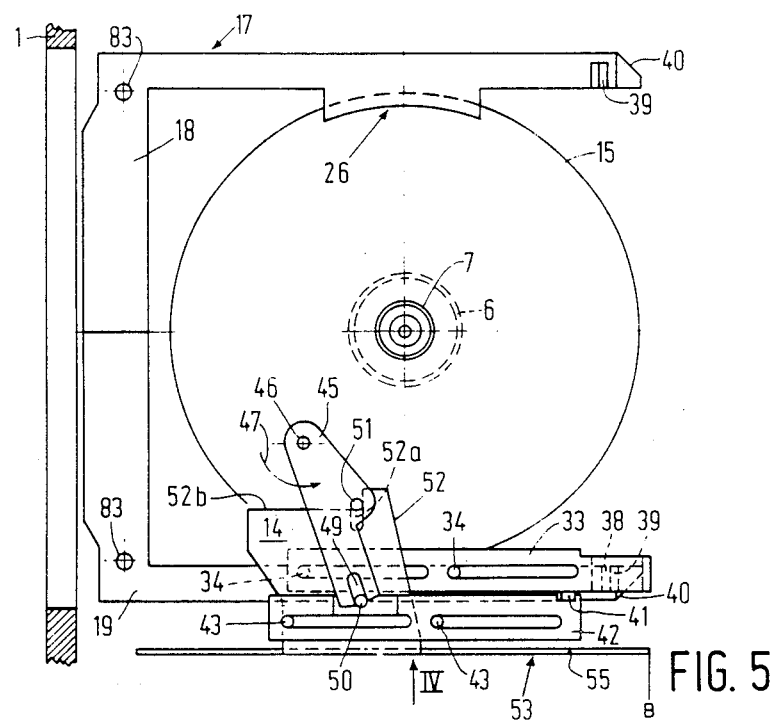
FIG. 5 is a view similar to FIG. 2 showing the disc holder in the position which it occupies when it has been inserted fully into the transfer means, the transfer means and disc pressure means again being omitted.

During a first stage of its movement in the direction of the arrow 16a the servo member is displaced from position A shown in FIGS. 2, 3 and 4 to position B shown in FIG. 5. This displacement of the servo member 53 causes a disc-holder-insertion control element constituted by the wall of the slot 52a in the first control limb 52 of the servo member to drive the pin 51 on the stroke-amplifying lever 45 so that this lever performs a pivotal movement about the spindle 46 in the direction indicated by the arrow 47 the position shown in FIG. 5. As a result of this movement of the lever 45 the pin 50 on the second actuating slide 42 performs a stroke which is equal to substantially twice the stroke of the servo member 53. In the present embodiment the distance between positions A and B of the servo member is approximately 14 mm, whilst the actuating slide 42 is moved approximately 30 mm in the direction indicated by the arrow 16. Through the coupling formed by the projected 41 the second slide 42 drives the first slide 33. After a specific travel of the slides 33 and 42 the slide 33 can no longer move up and down relative to the transfer means 29, so that the disc holder 17 is rigidly coupled to the servo member 53 by the projection 38 and cannot be withdrawn by hand. Thus, the pins 43 and 34 move towards the forward ends of the straight guide slots in the slides 42 and 33. The servo member 53 has now moved so far that the pin 51 is moved out of the slot 52a, which also terminates the movements of the two slides 42 and 33. By this movement, due to the coupling provided by the projection 38 and the disc holder 17 is slid fully into the transfer means 29 and the short limbs of the clamping members 18 and 19 of the disc holder are now situated inside the housing 1 as shown in FIG. 1. Thus, the parts of the transfer device, comprising the transfer means 29 and the disc holder 19, are combined to form a unit.

Figure 6:
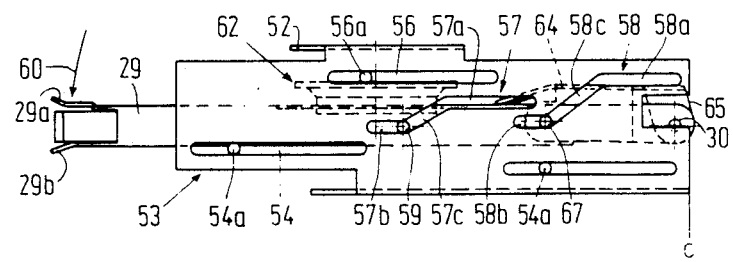
FIG. 6 is a side view of the loading device looking in the direction of the arrow VI in FIG. 5 and showing the transfer means in a lowered position relative to the turntable.

Simultaneously with the movement of the slides 42 and 33 the pins 59 and 67 move along the guideways 57a and 58a respectively owing to the displacement of the servo member 53. In the position shown in FIG. 5 the centre hole of the disc 15 is coaxial with the axis of rotation 6a of the turntable 6. As the servo member 53 moves further in the direction indicated by the arrow 16a towards the position designated C in FIG. 6, the pins 59 and 57 will move down the downwardly inclined guideways 57c and 58c, respectively. The guideway 57c constitutes a lift control element of the servo member 53, which control element now guides the transfer device comprising the transfer means 29 containing the disc holder 17 towards the turntable 6 in a downward direction as indicated by the arrow 60. A pressure-means control element formed by the guideway 58c also guides the disc-pressure means 62 towards the turntable during this stage of the movement. In this respect it is important that the movement of the disc pressure means 62 is faster than the movement of the transfer means 29. As a result of this, the blade spring 63 is extended and the disc pressure means 62, which is initially spaced above the transfer means 29, catches up with the transfer means 29 in order to enable the disc to be urged against the turntable when it has been lowered onto the turntable 7 as is shown in FIG. 6. Position C of the servo member 53 as shown in FIG. 6 is reached from position B in FIG. 5 after a travel of approximately 8 mm in the present embodiment. When the disc has been lowered the disc pressure means is magnetically coupled to the turntable. The disc pressure means 62 can rotate freely with the turntable owing to the circumferential clearance of the disc pressure means relative to the blade spring 63.

The displacement of the servo member 53 between the positions C and D is approximately 18 mm, so that the total displacement of the servo member from position A to position D is approximately 40 mm. As already stated, when during the movement the servo member 53 reaches position B the pin 51 on the lever 45 has become disengaged from the slot 52a in the first control limb 52 of the servo member and, as can be seen from FIG. 1, during the movement of the servo member from position B to position C the pin 51 has subsequently been moved along an edge portion 52b of the control limb 52. Consequently, when position B has been reached, the disc-holder insertion control element formed by the slot 52a is inoperative during the movement of the servo member 53 from position B to position C so that the slides 42 and 33 are not moved any further. During the downward pivotal movement of the transfer means 29 in the direction indicated by the arrow 60 the first actuating slide 33 moves with the transfer means, this pivotal movement of the slide being possible owing to the presence of the inclined wall portions 41a and 41b of the projection 41.

Figure 7:
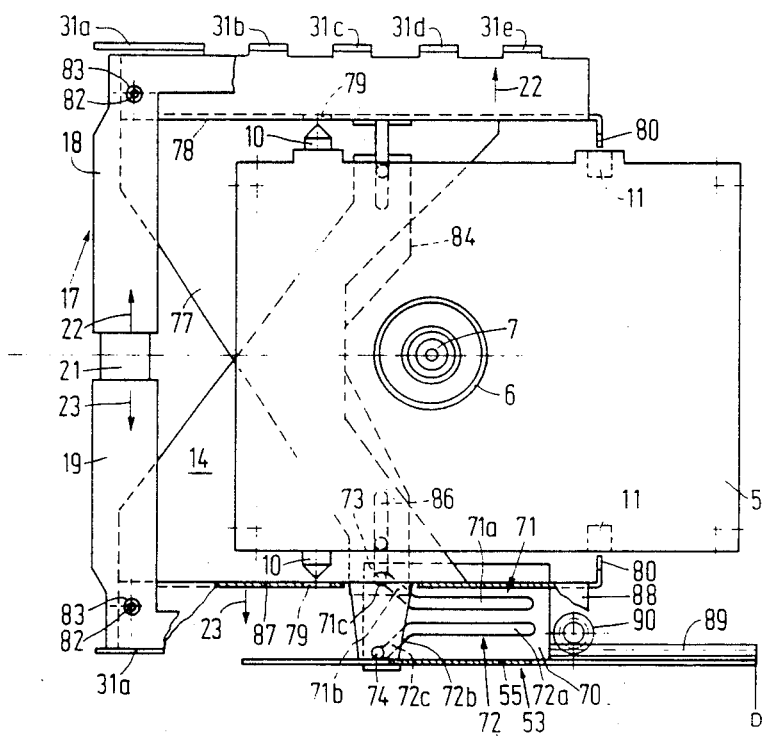
FIG. 7 is a view similar to FIG. 4 showing parts of the loading device in the position which they occupy when the servo means is at the end of its travel in the loading operation.

During the movement of the servo member from position A to position C the pins 73 and 74 have followed the associated straight guideways 71a and 72a in the second control limb 70 of the servo member. From position C these pins now travel along the diverging guideways 71b and 72b respectively. The first portions of the guideways 71b and 72b constitute a clamping member control element which during this stage of the movement of the servo member 53 cause the sliding elements 75 and 76 to move in opposite directions away from one another as indicated by the arrows 22 and 23 respectively. During the lowering of the transfer means 29 the coupling pins 82 on the sliding elements 75 and 76 became engaged in the bores 83 in the clamping members 18 and 19 of the disc holder 17 so that these members are moved away from each other when the sliding elements 75 and 76 are moved away from each other. As a result of this movement of the clamping members the clamping portions 26 of the clamping members are also moved apart, so that the disc 15 is released from the disc holder 17. This release of the disc is effected during the first stage of the movement of the sliding elements 75 and 76 away from each other, which stage is effected by the movement of the pins 73 and 74 in the first positions of the diverging guideways 71b and 72b respectively. The movement of the sliding elements 75 and 76 away from each other also results in the openings 79 and projections 80 of the elements 75 and 76 moving in the directions indicated by the arrows 22 and 23 respectively. During the first stage of the movement of the sliding elements 75 and 76 away from each other, however, the openings 79 and the projections 80 still remain in engagement with the pins 10 and the openings 11 respectively to lock the subframe 5 to the loading device. This is because the lengths of the cylindrical portions of the pins 10 and the parallel portions of the edges of the projections 80 which portions are engageable with the walls of the openings 79 and the openings 11 respectively, are greater than the distance over which the sliding elements travel during the first stage of their movement away from each other, which distance is, for example 2.5 mm. During the subsequent second stage of the movement of the sliding elements 75 and 76 away from each other, which may be, for example, over a distance of 3.5 mm and which is effected by movement of the pins 73 and 74 in second portions of the diverging guideways 71b and 72b, the openings 79 and projections 80 are disengaged from the pins 10 and openings 11 to unlock the subframe 5 from the loading device 14. The second portions of the diverging guideways 71b and 72b thus constitute a locking-means control element. The servo member is now in position D shown in FIG. 7. When the pins 73 and 74 have entered the short straight guideways 71c and 72c respectively, the drive motor of the servo member 53 is stopped. Now the disc may be played without the risk of shocks to which the housing 1 is subjected being transmitted via the loading device to the subframe 5 carrying the turntable 7 and the read means 9.

When the user wishes to remove the disc from the disc-record player a push-button (not shown) is pressed to restart the drive motor of the servo member 53 in the reverse direction to move the servo member in the direction indicated by the arrow 35a, as a result of which the sliding elements 75 and 76 move towards each other in the directions indicated by the arrows 24 and 25 in FIG. 1, first to lock the subframe 5 again by bringing the openings 79 and the projections 80 into engagement with the pins 10 and the openings 11, and then to move the clamping members 18 and 19 towards each other so that the disc 15 is again held by the clamping portions 26 of these members, the V-section grooves in the clamping portions 26 ensuring that the disc is positioned correctly in the disc holder 17. Subsequently, the transfer device, comprising the transfer means 29 and the disc holder 17 and the disc pressure means 62 are raised, the disc pressure means again being moved more rapidly than to transfer device to allow an unimpeded removal of the disc holder after the position shown in FIG. 3 has been reached. During the movement of the servo member 53 in the direction indicated by the arrow 35a the operations of the five control elements described above are performed in the reverse sequence. By means of the hook 37 the disc holder 17 is slid partially out of the transfer means 29 in the direction indicated by the arrow 35 during the movement of the servo member 53 between position B and position A, so that at the end of this movement the short limbs of the clamping members 18 and 19 of the disc holder 17 again project from the housing 1 and the user can readily grasp the disc holder to slide it out of the transfer means through the front opening 13 of the housing and can subsequently insert another disc holder with the associated disc.

The use of the one servo member 53 results in a compact control mechanism for the loading device. In this respect it is advantageous that the control limbs 52 and 70 and the control plate 55 of the servo member are arranged in the form of a U, the control plate 55 being situated near one side of the subframe 5 and the two control limbs extending above and beneath the subframe respectively. This renders the construction of the loading device particularly suitable for use in disc-record players in mobile installations, such as those fitted in cars. The loading device is also suitable for use in portable equipment, in which case the subframe of the record player may be arranged in a vertical position. An important feature of the disc-record player described above is that the subframe 5 forms a self-contained unit inside the housing. This has the advantage that a standard construction of disc-record player may be employed, requiring only minor modifications. As a result of this, the invention can be readily applied to many types of disc-record player.

It is to be noted that the servo member 53 offers more possibilities than those described in the foregoing. For example, it is possible to have a pause or stand-by position which would enable the playing cycle to be briefly interrupted. This may be effected by moving the servo member from position D in FIG. 7 in the direction indicated by the arrow 35a over a short distance until position C shown in FIG. 6 is reached. In order to detect this position of the servo member the drive motor for the servo member can be stopped in this position C by means of a switch, not shown. In this position C the subframe 5 is again locked to the loading device and the disc is held in the disc holder 17, so that both the subframe 5 and the disc 15 occupy fixed positions inside the housing 1. When the disc-record player is to be started again the drive for the servo member is restarted by means of a push-button (not shown) to move the servo member back in the direction indicated by the arrow 16a, and playing may recommence when the disc and the subframe have been released. There are further possibilities, one being to start the drive motor of the servo member 53 automatically by means of electronic control circuitry at the instant when the read means has reached the end of the tracks on the disc, so that the disc holder 17 is automatically moved to position A when the disc has been played.

In order to obtain the various intermediate positions of the servo member 53 a number of slip contacts may be arranged on the control plate 55 in a manner not shown to scan tracks on a printed circuit board. This enables the various positions of the servo member to be defined in a simple and cheap manner by means of electronic control circuitry.

Further it is to be noted that instead of the projections 80 and the openings 11 further pins 10 and openings 79 may be provided at the locations of the openings 11 and the projections 80 respectively. Alternatively, the pins 10 may be arranged on the walls 78 and 87 and the openings 79 may be formed in the subframe 5.

Figure 8:
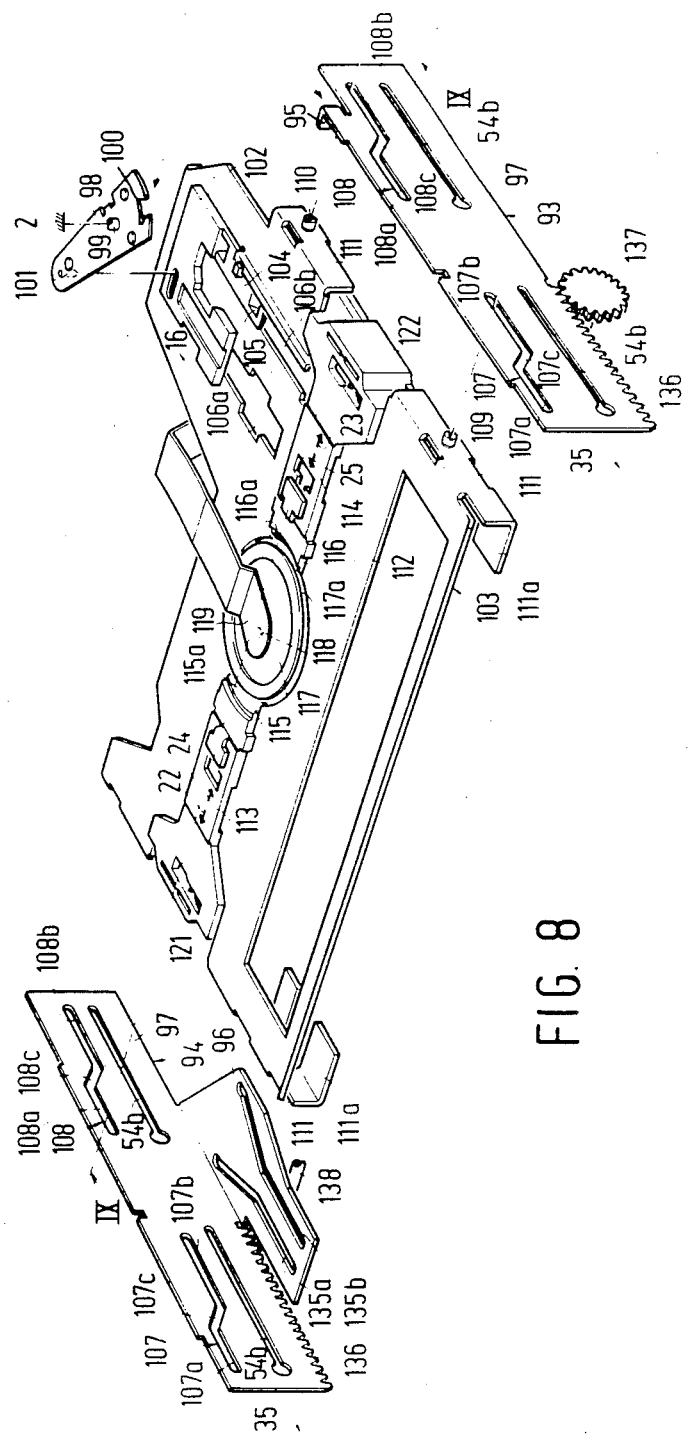
FIG. 8 is an exploded perspective view of the loading device in a second embodiment of the invention.
Figure 9:
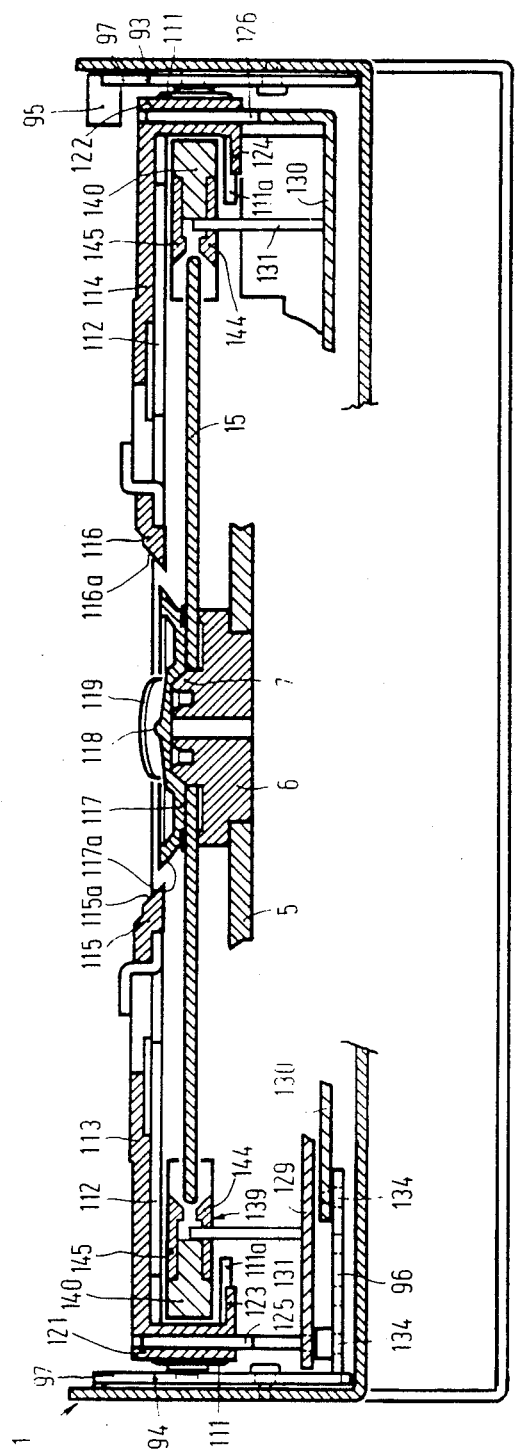
FIG. 9 is a sectional view taken on the lines IX—IX in FIG. 8 showing a disc holder inserted in the transfer means and opened to release the disc.

The second embodiment of the invention shown in FIGS. 8 and 9 employs a servo means comprising two servo members, namely, a first servo member 93 and a second servo member 94. These servo-members each comprise a control plate 92. The first servo member 93 comprises a perpendicularly bent lug constituting a first control limb 95, and the second servo member 94 comprises a second control limb 96. The two control plates 97 are substantially mirror images of one another. The first control limb 95, which constitutes the disc-holder insertion control element of the loading device, can cooperate with a stroke-amplifying lever 98, which is pivotally mounted on the frame 2 by means of a spindle 99 and which on one side of this spindle is provided with a recess 100 which is engaged by the control limb 95 during insertion of the disc holder. On the other side of the spindle 99 the lever 98 carries a pin 101 which engages in a hole in an actuating slide 102. The slide 102 comprises two spaced parallel limbs which are slidably guided in the direction indicated by the arrow 16 in slots 106a and 106b in a transfer means 103, the portion of the slide 102 between the limbs extending substantially transversely of the direction indicated by the arrow 16. A clamping member 104 is connected to one of the limbs of the slide 102 so as to be movable up and down relative thereto. The member 104 is provided with a projection 105 similar to the projection 38 of the clamping member 36 in the first embodiment. In a manner not shown the member 104 is provided with a hook at the back, which hook is similar to the hook 37 in the first embodiment.

In the present embodiment the control plate 97 on each side of the transfer means 103 is provided with two control slots 107 and 108. The control slot 107 comprises two horizontal straight guideways 107a and 107b interconnected by an inclined guideway 107c, whilst the control slot 108 also comprises horizontal straight guideways 108a and 108b interconnected by an inclined guideway 108c. The relevant corresponding portions of the control slots 107 and 108 extend at the same levels and in the same directions relative to the cover 12 of the housing 1. This embodiment differs from the preceding embodiment in that the guideways 107c, 108c are downwardly inclined towards the rear of the housing of the record player instead of towards the front, so that the two servo members 93, 94 move in the direction indicated by the arrow 35, opposite to the direction of movement of the servo member 53 in the preceding embodiment, when the disc 15 is moved towards the turntable 6. The control slots 107, 108 are engaged by pins 109, 110 arrangd on side walls 111 which at the top adjoins a supporting plate 112 of the transfer means 103 and at the bottom adjoin supporting flanges 111a. The slide 102 is slidably guided on the plate 112 in which the slots 106a, 106b are formed. Further, two slides 113 and 114 are guided on the plate 112 so as to be slidable in directions transverse to the arrow 16, namely, in directions away from each other as indicated by the arrows 22, 23 or towards each other as indicated by the arrows 24, 25. On their ends which face one another the slides 113, 114 comprise arcuate wedge-shaped lifters 115 and 116 respectively, which lifters are adapted to cooperate with a disc pressure means 117 which has a fausto-conical peripheral portion 117a whose diameter increases in a direction away from the turntable 6. Thus, as they are moved towards each other as indicated by the arrows 24, 25 the lifters 115, 116 can lift the disc pressure means 117 away from the turntable 6 by cooperation of the inclined surfaces 115a, 116a of the lifters with the fausto-conical surface on the periphery of the disc pressure means 117. Projecting from the upper side of the disc pressure means 117 is a boss 118 forming a pivotal thrust bearing on which bears a blade spring 119. The blade spring 119 extends for some distance in the direction of the arrow 16 and at its forward end has a downwardly offset portion which bears on the boss 118. At its the rear end the blade spring is secured to the subframe 5 in a manner not shown. When a disc 15 is in the playing position on the turntable 6, as shown in FIG. 8, the blade spring 119 urges the disc pressure means 117 against the disc 15, so that the disc is held in a stable position on the turntable 6.

On both sides of the transfer means 103 the slides 113, 114 are provided with downwardly extending side walls 121, 122 which at the bottom adjoin flanges 123, 124 which extend parallel to the plate 112. Two coupling members 125, 126 are vertically slidable in the side walls 121, 122, which members may be compared with the lugs 31c in the preceding embodiment and are arranged on sliding elements 129, 130 which extend over one another and which correspond to the sliding elements 75 and 76 in the preceding embodiment. The sliding element 129 extends to the right from the coupling member 125, as viewed in FIG. 9, and the sliding element 130 extends to the left from the coupling member 126. These sliding elements carry coupling pins 131 similar to the coupling pins 82 int he preceding embodiment. The sliding elements 129, 130 further carry pins 134 at their left-hand ends, which pins 134 engage in control slots 135a and 135b in the second control limb 96 on the servo member 94. These control slots may be compared with the control slots 71 and 72 in the preceding embodiment. The slides 113, 114, which control the disc pressure means 117, are controlled by the control slots 135a and 135b, which have portions that diverge in the direction of the arrow 16. Thus, in this embodiment, the control element, for controlling the disc pressure means is formed by the diverging guideways formed by the diverging portions of the control slots 135a and 135b.

On their lower sides the two servo members 93, 94 are provided with toothed racks 136 which cooperate with the pinions 137 mounted on a common spindle 138. Thus, the two servo members are driven by a drive motor of a central drive mechanism via the spindle 138. This ensures that the movements of the two servo members are synchronized correctly.

In the present embodiment the transfer device comprises a disc holder 139 which is shown in move detail in FIGS. 10 to 12. This disc holder 139 comprises an externally rectangular frame 140 with a circular central opening 141. At the front this disc holder 138 has chamfered corners 142. On two diametrically opposite sides of the opening 141 two clamping members 143 are slidably mounted on the frame 140, the two clamping members being arranged mirro-symmetrically relative to each other. The clamping members 143 each comprise upper and lower plates 145 and 144, which are rigidly connected to each other by two pins 146 which are slidably guided in slots 147 in the frame 140. The pins 146 are accurately guided in the slots 147 in directions perpendicular to that indicated by the arrow 16, and preferably each clamping member is rigidly held in its two end positions, for example by clamping, relative to the frame 140. As can be seen in FIG. 10, each clamping member 143 comprises two clamping portions 148 located between the two pins 146, which clamping portions, as shown in FIG. 11, each have two clamping surfaces 148a, 148b which are in cross-section arranged as a V. Preferably, the two clamping surfaces of each clamping portion are arranged in the same way as the inner surfaces of the two halves of a yo-yo, so that a disc 15 disposed between the two clamping surfaces contacts them over a minimum part of its circumference in the clamped position. Other parts of the disc are clear of the disc holder. Due to the provision of slits in the plates 144, 145 on both sides of each clamping portion 148 the clamping portions can deflect slightly in the vertical direction. The pins 146 are hollow for receiving the coupling pins 131 on the sliding elements 129 and 130 when the transfer means 103 is lowered after insertion of the disc holder 139, so that the clamping members 143 can be moved away from and towards each other by the sliding elements 129 and 130.

The operation of the loading device in this embodiment of the invention is very similar to the operation of the loading device 14 in the preceding embodiment. At the end of the manual insertion of the disc holder 139 containing the disc 15 the projection 105 snaps into a recess 149 in the upper side of the frame 140 of the disc holder 139. The drive motor, not shown, is now started by means of a switch, so that the servo members 93, 94 begin to move in the direction indicated by the arrow 35. This results in the lever 98 being pivoted clockwise about the spindle 99 so that the slide 102 is moved backwards as indicated by the arrow 16 to pull the disc holder 139 fully into the transfer means 103. During this part of the movement of the servo members the pins 109 and 110 on the transfer means 103 remain in the straight guideways 107a and 108a respectively. The transfer means 103, which in the present embodiment occupies a horizontal position relative to the cover 12 during insertion of the disc holder, is now moved downwardly towards the turntable 6 by the action of the inclined guideways 107c and 108c on the pins 109 and 110. The control limb 95 functions as the disc holder insertion control element of the loading device. During insertion of the disc holder the two slides 113, 114 are in a position in which they have been slid towards each other so that the disc pressure means 117 is raised relative to the transfer means 103 against the action of the spring 119. Thus, the disc pressure means cannot obstruct the insertion of the disc holder. During insertion of the plate 112 provides guidance at the upper side of the disc holder 139, while the side walls 121, 122 and bottom flanges 123 and 124 of the slides 113 and 114 guide the disc holder at the sides and the bottom. After the guideways 107c, 108c, which function as the lift control element of the loading device in this embodiment, have moved the transfer device comprising the disc holder in the downward direction, the diverging portions of the two control slots 135a and 135b cooperating with the pins 134, move the sliding elements 129, 130 away from each other in the directions indicated by the arrows 22, 23. During the lowering of the transfer means 103 the pins 131 on the sliding elements 129 and 130 enter the bores of the hollow pins 146, thereby coupling the sliding elements 129, 130 to the clamping members 143 of the disc holder. The movement of the sliding elements 129 and 130 away from each other by the control slots 135a, 135b causes three functions to be performed in succession. First, the control slots 135a and 135b, functioning as the pressure means control element, cause movement of the disc pressure means 117 towards the turntable 6. This is achieved by the coupling members 125 and 126 on the sliding elements 129 and 130 moving the lifters 115, 116 apart so that the blade spring 119 can press the disc pressure means 117 downwards to urge the disc 15 onto the cone 7 on the turntable in the correct position. Next, the coupling pins 131 move the two clamping members 143 of the disc holder away from the disc, so that the disc is now clear of the disc holder. Thus, the control slots 135a, 135b also act as the clamping member control element of the loading device. Finally, in a manner not shown but similar to that in the first embodiment, locking means on the sliding elements 129, 130 release the subframe 5. Preferably, these three functions are performed consecutively during passage of the pins 134 on the sliding elements 129 and 130 along succeeding sections of the diverging portions of the control slots 135a, 135b.

As described, the servo means comprises two servo members which support the transfer means 103 at all times in a position parallel to the cover 12, so that the disc holder can be inserted in a direction parallel to the cover. During insertion the disc holder is guided accurately in the transfer means 103. The construction of the disc pressure means 117 in combination with the present loading device makes it possible to minimize the height of the housing. The height occupied by the disc pressure means above the transfer means 103 can be minimal and the spring-loading of the disc pressure means obviates the need for any magnetic action of the disc pressure means. This may be of advantage in avoiding the adverse effect which such a magnetic disc pressure means may have on the read means. A record disc can be easily inserted into the disc holder 139 by moving the clamping members 143 apart, the yo-yo type of construction of the clamping portions 148 of these members providing an effective clamping of the disc. In this respect it is of advantage that the disc is held at a very small number of points, since this reduces the risk of damage to the disc surface. During removal of the disc from the turntable the clamping portions 148 can readily grip the disc 15, the inclined surface 148a, 148b of the clamping portions providing a satisfactory centering of the disc in the disc holder. The operations performed during removal of the disc take place in a reverse sequence to that of the operations described above for loading the disc.

A third embodiment of the invention, of which some parts are shown in a schematic plan view in FIG. 13, differs from the two other embodiments in particular in that the disc is inserted directly by hand into the front opening 13 and in that it does not comprise a transfer means. Insertion results in two pivotally mounted bifurcate levers 150, 151 being pivoted from the position shown in solid lines in the directions indicated by the arrows 152, 153 towards the pivotal position shown in broken lines. The levers 150, 151 are arranged mirror-symmetrically relative to each other. Therefore, whenever possible only the right-hand lever 150 will be described. Near its free ends the lever 150 carries clamping means 150a, 150b which are constructed for example as studs of an elastic synthetic material. During the pivotal movement a tension spring between the clamping means 150b and 151b is tensioned, which spring tends to pivot back the levers. However, this is not possible because at the end of the pivotal movement the lever 150 has closed a switch 155 which starts the drive of the servo means. The servo means is largely identical to that shown in FIGS. 8 and 9 and corresponding parts bear the same reference numerals. The servo member 93 now begins to pivot the lever 98 in the direction indicated by the arrow 156. As a result of this, the actuating slide 157, whose operation resembles that of the slide 102 in FIG. 8, is moved in the direction of insertion (arrow 160). As the slide 157 is connected to the lever 150, this lever is also moved in the direction of insertion indicated by the arrow 160. During this movement a pin 150C which is coaxial with the pivotal axis of the lever 150 is guided rectilinearly in a slot 158 in the slide 114, which slot extends parallel to the direction of insertion (arrow 160) The movement of the lever causes a pin which is situated in line with the clamping means 150C to be guided along a guide edge 114a on the slide 114, so that the lever 150 remains in its pivoted position. In this way, the lever eventually assumes the position indicated by the dash-dot lines.

As the servo member 94 is also coupled to the lever 151 via an actuating slide 159 in a manner not shown, the servo member 94 has moved the lever 151 in a way similar to and in synchronism with the movement of the lever 150. Thus, in the position shown in dash-dot lines, the levers 150, 151, which function as a transfer device of the loading device, have transferred the disc to a position straight over the turntable. The subsequent movements of the servo means corresponds to those in the other embodiments, namely the movement of the levers 150 and 151 towards the turntable under control of the lift control element, the movement of the slides away from each other under control of the clamping-member control element, so that the levers 150 and 151 are moved apart and the disc is released from the clamping means 150a, 150b, 151ab, 151b. When the slides 113 and 114 are moved apart the levers 150 and 151 remain in their pivoted positions because the guide edges 114a and 113a and the slots 158 are moved along and keep the levers in the correct positions. Finally, the disc is pressed down by means of the pressure-means control element and the subframe is unlocked by the locking means control element. For the removal of the disc this cycle of movements is reversed. After the servo means has been switched off the tension spring 154 then causes the levers 150 and 151 to pivot back. The disc is partly slid out of the front opening, so that it can be removed by hand. It is to be noted that as an alternative the embodiment shown in FIG. 13 may comprise only one lever, for example the right-hand lever 150, and an associated servo member, in which case the left-hand slide 113 is provided with a straight guide edge for the disc, along which edge the lever 150 causes the disc to slide during insertion and removal.

What is claimed is:

1. A disc-record player comprising:
    a housing having an opening for receiving a record disc,
    a subframe resiliently supported in the housing,
    a turntable carried on the subframe, and
    a loading device for loading a record disc onto the turntable; comprising a transfer means, mounted to said housing, for moving in a substantially axial direction with respect to said turntable between an upper position, in which a disc can be inserted through said opening onto said transfer means, and a lower position for depositing an inserted disc onto the turntable,
    characterized by comprising means for locking the subframe relative to the housing in a stable position at least prior to said transfer means reaching said lower position while the transfer means is moving to said lower position, and unlocking said subframe relative to the housing after the transfer means is moved to the lower position, so as to maintain alignment of the subframe and turntable with respect to said transfer means during loading of a disc onto the turntable, and permitting resilient movement of the turntable and subframe with respect to the housing, loading device and transfer means during playing of a disc-record.

2. A player as claimed in claim 1, characterized in that said means for locking the subframe comprises locking elements which lock said subframe at two opposite sides while the transfer means is in the upper position.

3. A player as claimed in claim 2, characterized by comprising two locking members, and at least one respective locking element carried on each locking member,
    and further characterized in that said opposite sides of the subframe extend parallel to the direction of movement of the record disc through said opening in the housing, each of said sides facing a respective locking member.

4. A player as claimed in claim 3, characterized in that said locking elements are constituted by projections and openings arranged on said sides of the subframe and said locking members respectively.

5. A player as claimed in claim 3, characterized by comprising a common locking means control element for controlling said locking members.

6. A player as claimed in claim 5, characterized by comprising a servo means for controlling movements of said common locking means control element and said transfer means.

7. A player as claimed in claim 6, characterized in that said servo means releases said locking members after movement of said transfer means to the lower position.

8. A player as claimed in claim 7, characterized in that said locking members are arranged to be movable substantially perpendicular to said opposite sides of the subframe.

9. A player as claimed in claim 8, characterized by comprising sliding members connecting said locking members to said locking means control members, for moving said locking members in opposite directions during operation of said control element.

10. A player as claimed in claim 9, characterized in that said locking means control element comprises two mutually inclined guide ways arranged to move said sliding members to unlock the subframe by movement of said sliding members.

11. A disc-record player comprising:
    a housing having an opening for receiving a record disc,
    a subframe resiliently supported in the housing, a turntable carried on the subframe, and
    a loading device for loading a record disc onto the turntable, comprising a transfer means for moving the disc from said front opening to a position over the turntable and subsequently towards the turntable to deposit the disc on the turntable; a servo means for controlling the movements of said transfer means, including means for driving said servo, and a plurality of control elements for controlling the various movements of the loading device; said control elements including an insertion control element arranged to cooperate with the transfer means to control the insertion movement of the disc toward a position over the turntable, and a lift control element which cooperates with the transfer means to guide the disc towards the turntable, characterized in that said transfer means comprises at least two clamping members for holding the disc in the transfer means during loading, said servo means further comprises a clamping member control element, controlling said at least two clamping members of the transfer means, for causing said members to be disengaged from the disc after the disc has been deposited on the turntable, the player includes locking means for locking the subframe relative to the housing during loading of the disc, and the servo means further comprises a locking means control element for controlling said locking means and causing said locking means to be disengaged from the subframe after the disc has been deposited on the turnable.

12. A player as claimed in claim 11, characterized in that said servo means is rectilinearly guided with respect to the housing, and comprises at least one servo member having a control plate disposed adjacent the transfer means, relative to the direction of insertion of the disc, said control plate adjoining at least one control limb which extends from the control plate toward the transfer device.

13. A disc-record player as claimed in claim 12, characterized in that the servo member comprises first and second control limbs which extend from the control plate on two opposite sides of the transfer device.

14. A disc-record player as claimed in claim 11, 12, or 13 characterized in that the transfer device comprises a disc holder containing a disc and transfer means, which disc holder is transferred into the transfer means to a position over the turntable by means of the insertion control element and is subsequently transferred with the transfer means to the turntable via the lift control element, the two clamping members forming part of the disc holder.

15. A disc-record player as claimed in claim 14, characterized by comprising an actuating slide coupled to the disc holder by insertion into the transfer means, and a pivotally mounted stroke-amplifying lever, the insertion control element being situated on a control limb and being coupled to the actuating slide and said lever which slide being subsequently moved by the control limb to move the disc holder until it is over the turntable.

16. A disc-record player as claimed in claim 15, which is also provided with a disc pressure means which is movable into a pressing position to urge the disc against the turntable, characterized in that the servo means also comprises a pressure-means control element for controlling the movement of the disc pressure means towards the pressing position.

17. A disc-record player as claimed in claim 16, characterized in the the lift control element and the pressure means control element are constituted by, respectively, first and second inclined guideways on the control plate, each of the inclined guideways adjoining at its ends straight guideways which extend parallel to the direction of movement of the control plate and the inclined guideways being so arranged relative to each other that the movement of the disc pressure means is faster than the movement of the transfer device.

18. A disc-record player as claimed in claim 17, characterized in that the clamping-member control element is constituted by two mutually inclined guideways on another or the second control limb, which guideways move two sliding elements which are coupled to the clamping members during the movement of the other or the second control limb, and which, when moved by said guideways, move said clamping members apart to release the disc.

19. A disc-record player as claimed in claim 18, characterized by comprising an actuating slide coupled to the disc holder by insertion into the transfer means, and a pivotally mounted stroke-amplifying lever, the insertion control element being suitated on a control limb and being coupled to the actuating slide and said lever which slide being subsequently moved by the control limb to move the disc holder until it is over the turntable, the servo means comprising first and second servo members, which are situated on opposite sides of the transfer means and are driven by a common drive means, characterized in that the first servo member comprises a first control limb and a control plate and the second servo member comprises a second control limb and a control plate.

20. A disc-recorder player as claimed in claim 19, characterized in that the sliding elements carry coupling pins which engage the clamping members of the transfer device during the movement towards the turntable.

21. A disc-record player as claimed in claim 10, characterized in that the locking means control element is constituted by two mutually inclined guideways, the sliding elements carrying locking means which are situated on opposite sides of the subframe and which are disengaged from the subframe to unlock the subframe by movements of the sliding elements relative to each other.

22. A disc-record player as claimed in claim 21, characterized in that the locking means comprise openings in the sliding elements, which opening are engageable by pins which are mounted on opposite sides of the subframe and which have a length such that the subframe is not unlocked until the clamping members have been moved apart and the disc has been released from the transfer device.

23. A disc-record player as claimed in claim 22, characterized in that the pressure means control element is constituted by two mutually inclined guideways, the two sliding elements each being coupled to an associated wedge-shaped lifter for moving the disc-pressure means away from the turntable and the disc pressure means being spring-loaded towards the turntable.

24. A disc-record player as claimed in claim 23, characterized in that each lifter is arranged on a slide which also constitutes a lateral guide portion of the transfer device for guiding the disc holder and which is coupled to the associated sliding element in such a way as to be movable relative thereto in directions corresponding to the directions of movement of the transfer means.

25. A disc-record player as claimed in claim 23, characterized in that the transfer device comprises two pivotal bifurcate levers whose free ends are each provided with a clamping means for retaining the disc, which levers are each coupled to a slide member which is operable to move the levers in mutually opposite directions by means of the clamping-member control element.

26. A disc-record player as claimed in claim 25, characterized in that after the disc has been inserted manually through the front opening each lever is provided into a final position, and during the cooperation of the lever with the insertion control element and the lift control element in said final position is moved to a position over the turntable and is transferred to the turntable, respectively.

27. A disc-record player as claimed in claim 26, characterized in that each lever is coupled to the insertion control element and the slide member via a pin/slot connection, which slot extends parallel to the direction of insertion.

* * * * *